United States Patent

[11] 3,547,285

[72] Inventor Paul Plummer
Potlatch, Idaho 83855
[21] Appl. No. 773,126
[22] Filed Nov. 4, 1968
[45] Patented Dec. 15, 1970

[54] ALIGNING DEVICE FOR BOAT TRAILERS
4 Claims, 7 Drawing Figs.
[52] U.S. Cl....................................................... 214/84;
193/35; 280/414
[51] Int. Cl........................................................ B60p 1/52
[50] Field of Search............................................ 214/505,
506, 84; 280/414, 143, 144, 145; 193/35, 37

[56] References Cited
UNITED STATES PATENTS
| | | | |
|---|---|---|---|
| 2,827,304 | 3/1958 | Backus.......................... | 280/143 |
| 3,111,236 | 11/1963 | Irey............................... | 214/506 |
| 3,447,815 | 6/1969 | West............................. | 214/84X |

*Primary Examiner*—Albert J. Makay
*Attorney*—Keith S. Bergman

ABSTRACT: Paired opposed upwardly extending guides are provided for placement at the rear of a boat trailer to aid in aligning a boat to be placed upon the trailer by flotation. The guides are pivotably mounted at spaced distance and independently mechanically biased toward each other to allow entry of a boat therebetween and aid in maintaining the boat in a symmetrically aligned position relative the guides during placement on a trailer by the normal flotation process. The guides contact the boat by rotatably mounted guiding rollers.

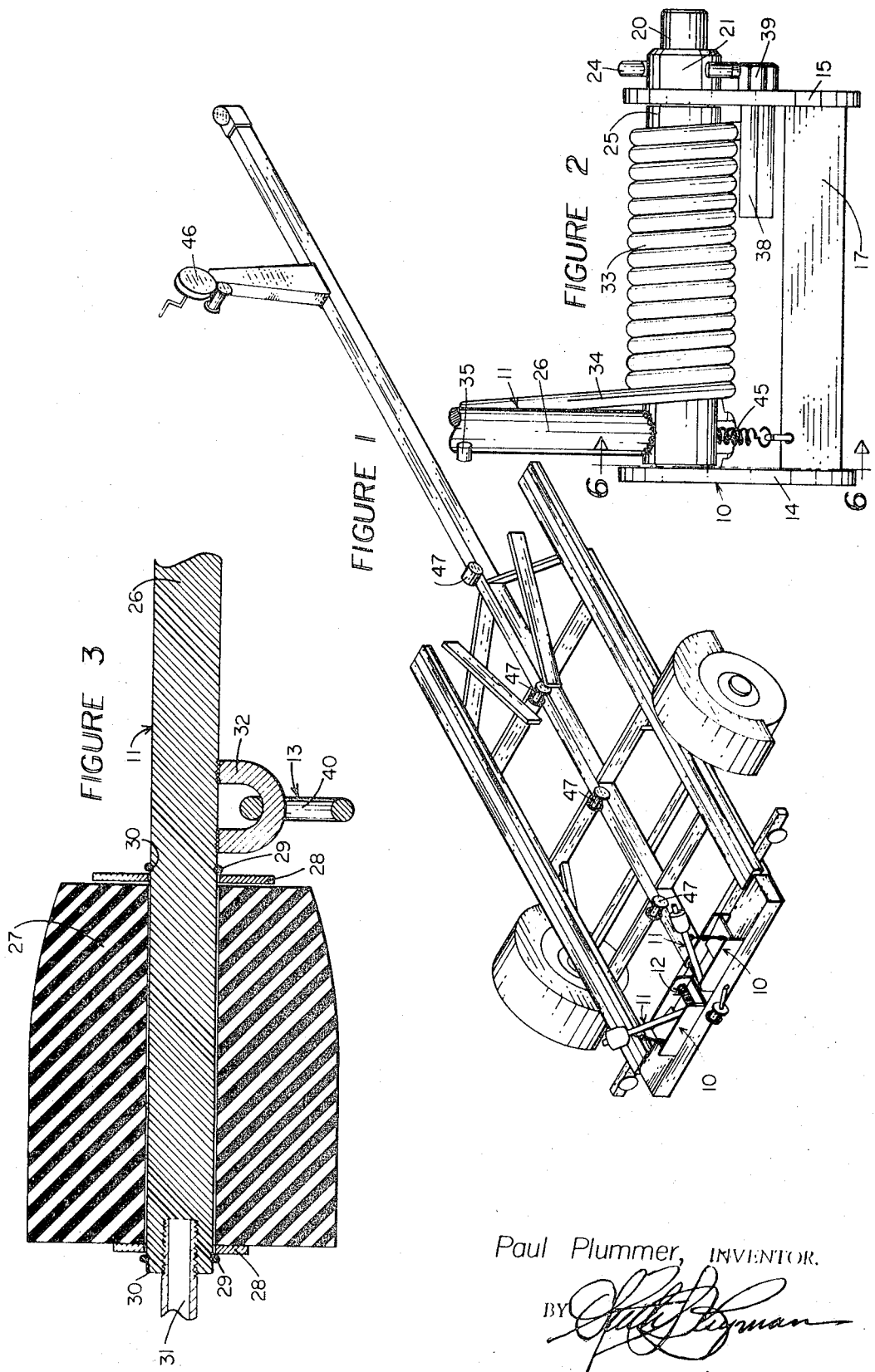

PATENTED DEC 15 1970

Paul Plummer, INVENTOR.

BY

ATTORNEY.

3,547,285

ALIGNING DEVICE FOR BOAT TRAILERS

BACKGROUND OF THE INVENTION

1. Field of the Invention

This invention relates generally to a guide to aid in placement of a boat by flotation upon a trailer and more particularly to such a guide providing independent opposed, mechanically biased arms to maintain the boat symmetrically therebetween during loading.

2. Description of the Prior Art

Light boats are often stored upon and carried between place of storage and use by light trailers. Such trailers normally provide a rigid frame journaling depending wheels for locomotion and are adapted to rollably receive a carried boat, generally by the keel, and maintain it in a symmetrical upright fashion thereon.

With the use of such trailers it becomes necessary to load and unload the boat therefrom when it is desired to place it in a body of water. The unloading operation is commonly accomplished by releasing the boat from attachment to the trailer and backing the trailer rather rapidly down an inclined ramp into the body of water with a rather sudden stop when the boat is in approximate position to leave the trailer by its inertia and enter the water.

The loading operation is more difficult. It generally is accomplished by placement of the trailer in the body of water at a level wherefrom the boat may be substantially floated onto the trailer. It is necessary, however, to position the boat symmetrically upon the trailer and move it therealong. To aid in this operation most boat trailers are provided with multiple keel rollers extending along a linear course in the center of the trailer over which the keel of the boat normally will pass. Some mechanical means of aiding the pulling of the boat upon the trailer is usually provided in the forepart or tongue of the trailer, most commonly a winch device of some sort to appropriately multiply force supplied to the boat. In this operation, alignment is not easily accomplished with the normally small keel rollers.

It has heretofore become known to provide supports in addition to the keel rollers to aid in this placement. Such devices as have become known may be divided generally into a first class comprising guides rigidly mounted relative the trailer, and a second class providing guides movably mounted in one fashion or another.

The instant invention is quite readily distinguishable from members of the first class as they provide no automatic adjustment for particular sizes and shapes of boats or for the varying cross-sectional sizes of an individual boat passing therebetween and because of this limitation, they generally have a great potentiality of damaging the boat during placement or else provide no alignment potentiality of any substantial benefit.

Members of the second class that are only discretely movable relative the trailer frame provide substantially the same problems or else require continuous adjustment for individual boats and varying configurations of the same boat passing thereover. Other members of this second class providing continuous motion have in general not provided a continuous mechanical bias tending to maintain a boat in symmetrical position during its passage thereover or else have provided some means of contact with the boat during its passage over the aligning device that tends to damage the boat surface. Such known devices also have not been of such form as to exist in a unitized structure that may be readily attached to existing trailers without substantial modification or alteration of either the trailer or aligning device. Other members of this second class also have not been adaptable for use upon boats of varying configuration without major adjustment either before or during use. My invention provides solutions to all of these problems.

Summary of Invention

My invention provides a unitized, pivotably mounted, mechanically biased guide to be positioned in opposed pairs at the rearward part of a boat trailer to rollably contact the boat hull and aid in symmetrically positioning it during placement upon the trailer by flotation.

To structurally accomplish this function, I provide a housing pivotably mounting an upwardly extending elongated guide arm carrying a roller structure in its uppermost part to contact a boat hull. The guide arm is biased by a torsion spring to a substantially vertical position but movable laterally downward by appropriate force to a substantially horizontal position with reference to the housing. Mechanical limitation prevents the guide arm from rotating upwardly further than the vertical. The roller structure carried by the guide arm is of cylindrical shape with axis of rotation substantially parallel to the surface of a craft as it passes thereover.

Two of these guide units are mounted in the rearward medial part of a normal boat trailer with the guide arms very nearly adjacent and extending upwardly. The mounting of the housing upon the trailer structure may be accomplished by bolting, welding or any like process. The length of the guide arms is such that the roller structures extending a substantial distance above the surface of the boat trailer so that they will contact the boat hull in its forwardmost portion as the bow of the boat approaches the guides to continually align the boat on the trailer during its passage therepast.

In providing such a mechanism it is:

A principal object of my invention to provide a guide system for boat trailers with upwardly extending, paired, opposed, mechanically biased guides adapted to contact the forward portion of the hull of a boat as it approaches a trailer and maintain the boat hull in a substantially symmetrical position relative the trailer during its passage forwardly over the guide structure.

A further object to create such a guide system that contacts a boat hull by means of rotatably mounted rollers having axis of rotation substantially perpendicular to the line of travel of the boat thereacross to prevent damage to the boat during passage over the rollers.

A further object of my invention to provide such a guiding device that is automatically movable by reason of its mechanism and bias to accommodate boats of varying sizes and to be continually in communication with the hull of a boat during passage of the various cross-sectional shapes thereof over the guiding device.

A still further object of my invention to provide such a guiding structure that is self-contained in a relatively small unit that may be readily fastened to and used upon ordinary boat trailers of commerce without any substantial modification of either my invention of the boat trailer.

A still further object of my invention to provide such a device that is of new and novel design, of rugged and durable nature, of simple and economic manufacture and one that is otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangement with only one preferred and practical embodiment being illustrated in the accompanying drawings, as required.

BRIEF DESCRIPTION OF DRAWINGS

In the accompanying drawings which form a part of this application and wherein like numbers of reference refer to similar parts throughout:

FIG. 1 is an isometric view of an ordinary boat trailer of commerce with my invention in place thereon.

FIG. 2 is an orthographic view of my invention, looking from the medial line of a boat trailer laterally outward, showing particularly the mechanical biasing of the guide arm.

FIG. 3 is a diametrical cross-sectional view through the guide arm to show the mounting of the roller thereon, such as would be seen on the line 3-3 of FIG. 6, when looking in the direction indicated by the arrows on this line.

DESCRIPTION OF THE PREFERRED EMBODIMENT

Figure 4:
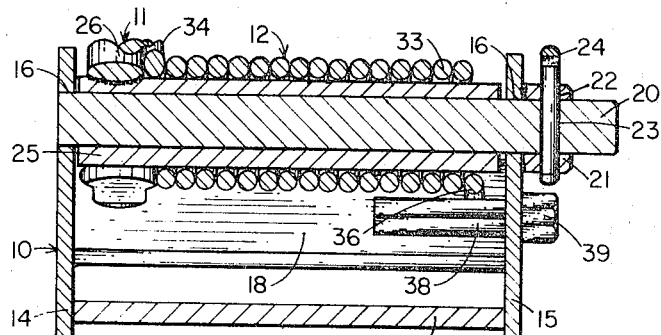
FIG. 4 is a cross-sectional view of the pivotably mounting of the guide arm on the guide housing, such as would be seen on the line 4-4 in FIG. 5 when looking in the direction indicated by the arrows thereon.

Referring now to the drawings in more detail and particularly to that of FIG. 1, it will there be seen that my invention generally comprises housing structure 10 pivotably mounting guide arms 11 with biasing structure 12 and motion limiting structure 13 extending therebetween to regulate the motion of the guide arm relative the housing.

Housing structure 10 is formed with similar paired opposed sides 14, 15 rigidly joined by angle iron crosspiece 17 and chain fastening plate 18. Similar opposed cooperating holes 16 are provided in the upper portion of each side to receive guide arm axle 20. Plural tension adjustment holes 19 are provided in side 15 to aid in the adjustable biasing of the guide arm structure as hereinafter more particularly described. These elements preferably are formed of metal and joined by welding.

Guide arm axle 20 extends through holes 16 in sides 14, 15 and some distance laterally beyond side 15 to allow releasable attachment to the housing structure with aid of collar 21. This collar 21 is the annular structure shown, welded to side 15 and provided with diametrically extending hole 22, cooperating with the hole 23 in guide arm axle 20 to receive cotter key 24 therethrough to maintain the entire structure in rigid but releasable position.

Guide arm structure 11 comprises pipelike guide arm bushing 25 pivotably mounted upon guide arm axle 20 between sides 14, 15. Guide arm 26 is relatively elongate, rodlike element structurally communicating with one end of the outer peripheral surface of arm bushing 25, preferably by welding, and extending substantially perpendicularly therefrom. The guide arm in its outer portion is provided with the pivotably mounted guide roller 27 maintained in rotatably position thereon with washers 28 on either side thereof between keeper rings 29 carried in grooves 30 in the surface of the guide arm. An outermost nipple 31 is provided to receive additional auxiliary structures (not shown), if such be desired to further aid in aligning boats of larger dimensions Chain retainer ring 32 is structurally attached to the guide arm immediately below the roller to receive the limiting chain.

Biasing structure 12 includes helical torsion spring 33, having an internal void allowing positioning of the spring about the outer surface of guide arm bushing 25. Fastening arm 34 of this spring extends radially outward for a distance to terminate in guide arm hook 35 adapted to appropriately communicate with the guide arm. The other end of this spring terminates in adjustment arm 36 extending radially outward a distance slightly greater than the external surface of the spring body 33. This adjustment arm is adapted to communicate with collar 38 threadedly carried by adjustment bolt 39 engaged in one of the plural tension bolt holes 19 in side 15.

It is to be noted that these adjustment holes are positioned in a spaced fashion at the same radial distance from the axis of pivot of guide arm bushing 25 so that adjustment arm 36 of the torsion spring will always contact the adjustment collar, but yet the tension in spring 33 may be adjusted to cause varying forces upon guide arm 26 depending upon the positioning of adjustment bolt 39 in one of the tension bolt holes 19.

Figure 7:
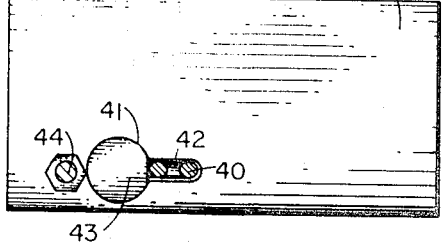
FIG. 7 is an orthographic top view of the chain plate showing particularly the method of adjustable fastening of the limiting chain therein.
Figure 6:
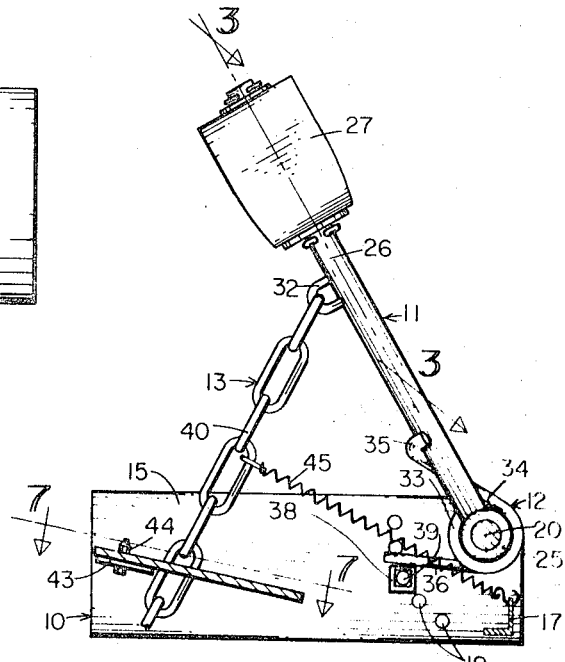
FIG. 6 is a similar view to that of FIG. 5 with the near side of the housing removed to show in more detail the internal structure of my invention from this aspect.
Figure 5:
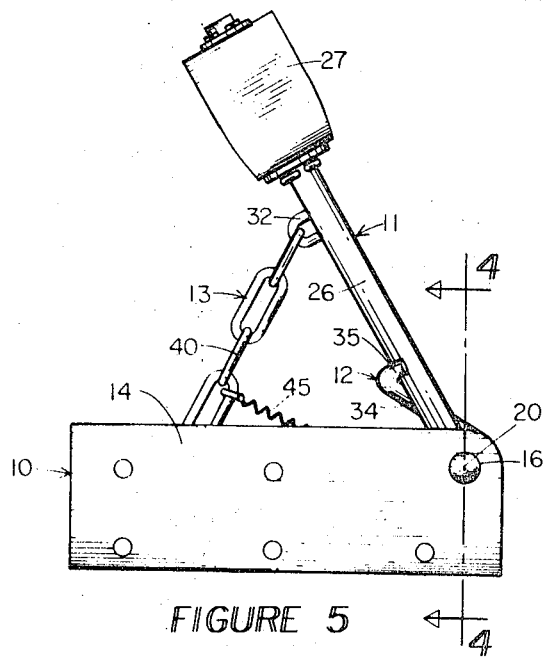
FIG. 5 is a partial side view of my invention showing particularly the side of the mounting structure.

Motion limiting structure 13 includes chain 40 extending between chain retainer 32 on guide arm 26 and chain-fastening plate 18 carried by the housing structure. The chain-fastening plate is provided with the holelike fastening structure providing circular hole 41 communicating with elongate slot 42 so configured that the chain will pass through the circular hole but when one link is carried in slot 42 as illustrated in FIG. 7, the next link will not pass therethrough. A small retainer plate 43 is pivotably mounted by nut-bolt combination 44 on one surface of the chain retaining plate to be pivotably movable over circular hole 41, as illustrated, to releasably position the chain in slot 42. With this arrangement then limiting chain 40 may be positioned with any particular link retained by the chain-fastening plate. An extension spring 45 extends between the medial portion of chain 40 and the medial portion of angle crosspiece 17 of the body structure to prevent the chain from becoming fouled if excessive slack be created therein during passage of a boat over the guiding structure.

Having thusly described the structure of my invention, its operation may now be understood.

Two guide structures, preferably one the mirror image of the other, are formed according to the foregoing specification and mounted in paired opposed fashion on the rearward part of an ordinary boat trailer frame, as illustrated in FIG. 1, with each guide arm angling upwardly and outwardly to form somewhat of a V shaped area therebetween. The positioning of the guide structures should be such that they are each substantially the same distance laterally outwardly from the centerline of the trailer, but exact distance of lateral positioning is not particularly critical because of the adjustable nature of the guide. In general, however, when the guides are normally biased, upwardly extending, position they should be relatively close to each other so that they will contact the forward sharper portion or bow of a boat. The body structures of the guides may be attached to the trailer frame by any of the normal means known in the mechanical arts, but preferably with metal structures by welding.

With the guides of my invention in place on the trailer, each guide arm is then adjusted to a substantially vertical, slightly laterally angled, position by appropriate positioning of chain 40 relative chain-fastening plate 18 and tension in torsion spring 33 is appropriately adjusted to maintain sufficient force upon guide arms 26 to allow them to maintain a boat in substantially aligned position when passing between the guide arms. In this fashion the device is then ready for the loading of a boat in the habitually familiar fashion.

To accomplish the loading operation the trailer is backed on a sloping ramp into the water whereon the boat to be loaded is floating. The forward portion or bow of the boat is generally attached by a cable (not shown) to winch 46 in the forward portion of the boat trailer and the boat while still floating is drawn by this winch toward the trailer. As the forward portion of the boat approaches the trailer, it is contacted on either side of the bow by the paired opposed guides of my invention and the portion contacted by these guides is maintained in alignment relative the rear portion of the trailer. This condition continues as the boat is pulled upon the trailer until such time as it is in final resting position upon the trailer with keel carried by the normal medial keel rollers 47. At this time the trailer may be removed from the water and the boat finally fastened to the trailer in the habitually familiar fashion.

In the loading operation it is to be noted that the boat will generally be substantially floating and will have forces applied to it at three points, that is its forwardmost portion by the cable carried by boat winch 46 and in paired opposed rearward spots by contact of rollers 27 with the hull as it passes thereover. With this arrangement of forces then, a boat is required of necessity to remain substantially symmetrical relative the trailer.

It is further to be noted from the foregoing structure that during the passage of the boat over the guide rollers, as the hull broadens or as more weight is placed upon the guide rollers, they will by reason of their pivotable mounting and mechanical bias move downwardly to accommodate the changing crossnsectional configuration of the boat and the greater amount of weight as more weight is transferred to the trailer by reason of less flotation.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

I claim:

1. Guide structures to aid in flotation positioning of a boat upon an elongate boat trailer, comprising:

paired opposed housing structures carried in laterally symmetrical position in the rear medial part of a boat trailer;

upwardly extending, paired opposed elongate guide arms pivotably mounted in perpendicularly projecting bushings, carried by each housing structure, to allow laterally downward motion of the guide arms;

independent mechanical biasing means communicating between each guide arm and each associated housing to bias the guide arm to a normally upward position; and motion limiting means communicating between the guide arms and the housing preventing motion of the guide arms past vertical.

2. Guide structures to aid in flotation positioning of a boat upon an elongate boat trailer, comprising:

paired opposed housing structures carried in laterally symmetrical position in the rear medial part of a boat trailer;

upwardly extending, paired opposed elongate guide arms pivotably mounted in perpendicularly projecting bushings, carried by each housing structure, to allow laterally downward motion of the guide arms;

independent mechanical biasing means communicating between each guide arm and each associated housing to bias the guide arm to a normally upward position;

the biasing means comprising a helical spring carried about the guide arm bushing in axial alignment therewith, the spring having one end communicating with the guide arm and the other end communicating with an adjustment bolt carried in one of a plurality of holes in the body structure to provide adjustable biasing of the guide arm; and motion limiting means communicating between the guide arms and the housing preventing motion of the guide arms past vertical.

3. The invention of claim 2 wherein the motion limiting means is further characterized by a chain communicating between the upper portion of the guide arm and a chain fastening plate carried by the body structure, the latter communication being of adjustable nature.

4. The invention of claim 2 wherein the guide arms are further characterized by:

rotatably mounted rollers carried in their upper portion to rollably guide a boat therealong; and rigid elongate guides extending thereabove to prevent lateral passage of a boat thereby.